United States Patent
Halberstadt et al.

(10) Patent No.: US 9,886,353 B2
(45) Date of Patent: *Feb. 6, 2018

(54) DATA ASSET RECONSTRUCTION

(71) Applicant: International Business Machines Corporation, Armonk, NY (US)

(72) Inventors: Benjamin Halberstadt, Jerusalem (IL); Ortal Nizri, Jerusalem (IL); Erel Sharf, Modiin (IL); Shlomo Steinhart, Ramat Bet Shemesh (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

This patent is subject to a terminal disclaimer.

(21) Appl. No.: 14/576,241

(22) Filed: Dec. 19, 2014

(65) Prior Publication Data

US 2016/0179630 A1    Jun. 23, 2016

(51) Int. Cl.
G06F 7/00 (2006.01)
G06F 17/00 (2006.01)
G06F 11/14 (2006.01)

(52) U.S. Cl.
CPC ...... G06F 11/1469 (2013.01); G06F 11/1402 (2013.01); *G06F 2201/82* (2013.01); *G06F 2201/84* (2013.01)

(58) Field of Classification Search
CPC .. G06F 11/1469; G06F 17/30; G06F 2201/82; G06F 2201/84; G06F 17/30477; G06F 17/30566

See application file for complete search history.

(56) References Cited

U.S. PATENT DOCUMENTS

| | | | |
|---|---|---|---|
| 6,434,558 B1 * | 8/2002 | MacLeod | G06F 17/30595 |
| 7,428,691 B2 | 9/2008 | Ouchi | |
| 8,145,603 B2 | 3/2012 | Yamagami | |
| 8,712,959 B1 | 4/2014 | Lim et al. | |
| 2005/0159905 A1 | 7/2005 | Bond et al. | |
| 2006/0080369 A1 * | 4/2006 | Razdow | G06F 17/2229 |
| 2007/0079082 A1 * | 4/2007 | Gladwin | G06F 11/1076 711/154 |
| 2008/0307104 A1 * | 12/2008 | Amini | G06F 17/30516 709/231 |
| 2009/0063534 A1 * | 3/2009 | Halberstadt | G06F 17/40 |
| 2009/0070237 A1 | 3/2009 | Lew et al. | |
| 2009/0313499 A1 * | 12/2009 | Deenadhayalan | G06F 11/1088 714/6.12 |

(Continued)

OTHER PUBLICATIONS

List of IBM Patents or Patent Applictions Treated As Related; (Appendix P), Filed Nov. 14, 2016, 2 pages.

(Continued)

*Primary Examiner* — Hasanul Mobin
(74) *Attorney, Agent, or Firm* — Cantor Colburn LLP

(57) ABSTRACT

According to an aspect, data asset reconstruction includes receiving a data lineage for a data asset, where the data lineage identifies a data source connected to the data asset by an intermediate process. It is determined whether the intermediate process can be used to reconstruct a lost data asset. Based on determining that the intermediate process can be used to reconstruct the lost data asset, reconstructing the lost data asset with the intermediate process and the data source.

14 Claims, 7 Drawing Sheets

(56) References Cited

U.S. PATENT DOCUMENTS

| | | | |
|---|---|---|---|
| 2011/0320460 A1* | 12/2011 | Fankhauser | G06Q 10/10 707/748 |
| 2014/0019423 A1* | 1/2014 | Liensberger | G06F 17/30309 707/690 |
| 2014/0040661 A1* | 2/2014 | Goel | G06F 11/1088 714/6.12 |
| 2016/0196190 A1 | 7/2016 | Halberstadt et al. | |

OTHER PUBLICATIONS

List of IBM Patents or Patent Applictions Treated As Related; (Appendix P), Filed Jun. 9, 2017, 2 pages.

Benjamin Halberstadt, et al., U.S. Appl. No. 15/618,333 entitled "Data Asset Reconstruction," filed with the U.S. Patent and Trademark Office on Jun. 9, 2017.

* cited by examiner

400

600

```
reconstructData(node)
    for each edgeUpsteam that is an upstream edge of node {
      ReconstructUpstreamData ( edgeUpstream) ;
      if (data has been reconstructed)
          return;
  } for each edgeDownstream that is a downstream edge of node {
      reconstructDownstreamData (edgeDownstream);
      if (data has been reconstructed)
          return:
      }
  } reconstructFromUpstreamNode(upStreamEdge) {
    if (!exist(source-of-upStreamEdge))
       reconstructData(source-of-upStreamEdge);
    if (exist(source-of-upStreamEdge) && isReRunnable(upStreamEdge))
       reRun(upStreamEdge);
  } reconstructFromDownstreamNode(downStreamEdge) {
    if (!exist(source-of-downStreamEdge))
       reconstructData(source-of-downStreamEdge);
    if (exist(source-of-downStreamEdge) && isReversible(downStreamEdge))
       reverseRun(downStreamEdge);
  }
```

FIG. 6

DATA ASSET RECONSTRUCTION

BACKGROUND

The present invention relates generally to reconstruction of a data asset. More specifically, embodiments described herein include partial and total reconstruction of data that may have been lost, for example, in a natural disaster, and was either not backed up properly, or the backup was lost as well.

SUMMARY

Embodiments include a system, method, and computer program product for data asset reconstruction. The method includes receiving a data lineage for a data asset, where the data lineage identifies a data source connected to the data asset by an intermediate process. It is determined whether the intermediate process can be used to reconstruct a lost data asset. Based on determining that the intermediate process can be used to reconstruct the lost data asset, reconstructing the lost data asset with the intermediate process and the data source.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 6 shows example pseudo code illustrating a method to reconstruct a data asset in accordance with an embodiment.

DETAILED DESCRIPTION

The subject matter disclosed herein relates to techniques for reconstructing a data asset. Enterprise computer systems or any other computer systems that use stored data rely on data assets. Data assets can be used to run an enterprise system's operational systems, to generate analytics, and in other reporting that enables timely business decisions. It is possible that a data asset can be lost in an irrecoverable way, for example through a natural disaster. The loss of a data asset may impact the core functioning of an enterprise. Many data asset systems implement disaster or loss recovery programs that protect data assets through backup programs, as one example. However, present backup solutions are not always ideal because a backup of the data asset may itself have been lost in the same disaster. Further, a particular data asset that is lost may not have been backed up due to negligence or error.

In the present disclosure, it is possible that lost data can be reconstructed even when the backup is lost or non-existent. Further, this disclosure outlines a number of techniques to minimize the number, frequency, and scope of situations in which a backup is needed as many data assets can be fully recovered using the presently disclosed techniques without needing a backup. This disclosure describes, in part, a new method for reconstructing a lost data asset. As seen in the figures and illustrations, a data asset may exist within the context of a larger data flow in that there may be upstream process and downstream processes to the data asset. An upstream process may write data to the data asset from an upstream data asset or data source. A downstream process may read data from the data asset and write it to a downstream asset or data source. Examples of processes executed to and from a data asset include extract, transform, and load (ETL) jobs that read from operational systems and write to a data warehouse. Another example process includes data lifecycle management tools that read from a warehouse to create test data. Another example process includes the process of reporting a reading of a data mart or any other layer of a data warehouse environment that is used to get data out to the users. For example, instead of a data mart, the reading could be of a subset of a data warehouse that is usually oriented to a specific slice of the total warehouse. In one embodiment, this reading may be done by an extension that enables analytics.

Figure 1:
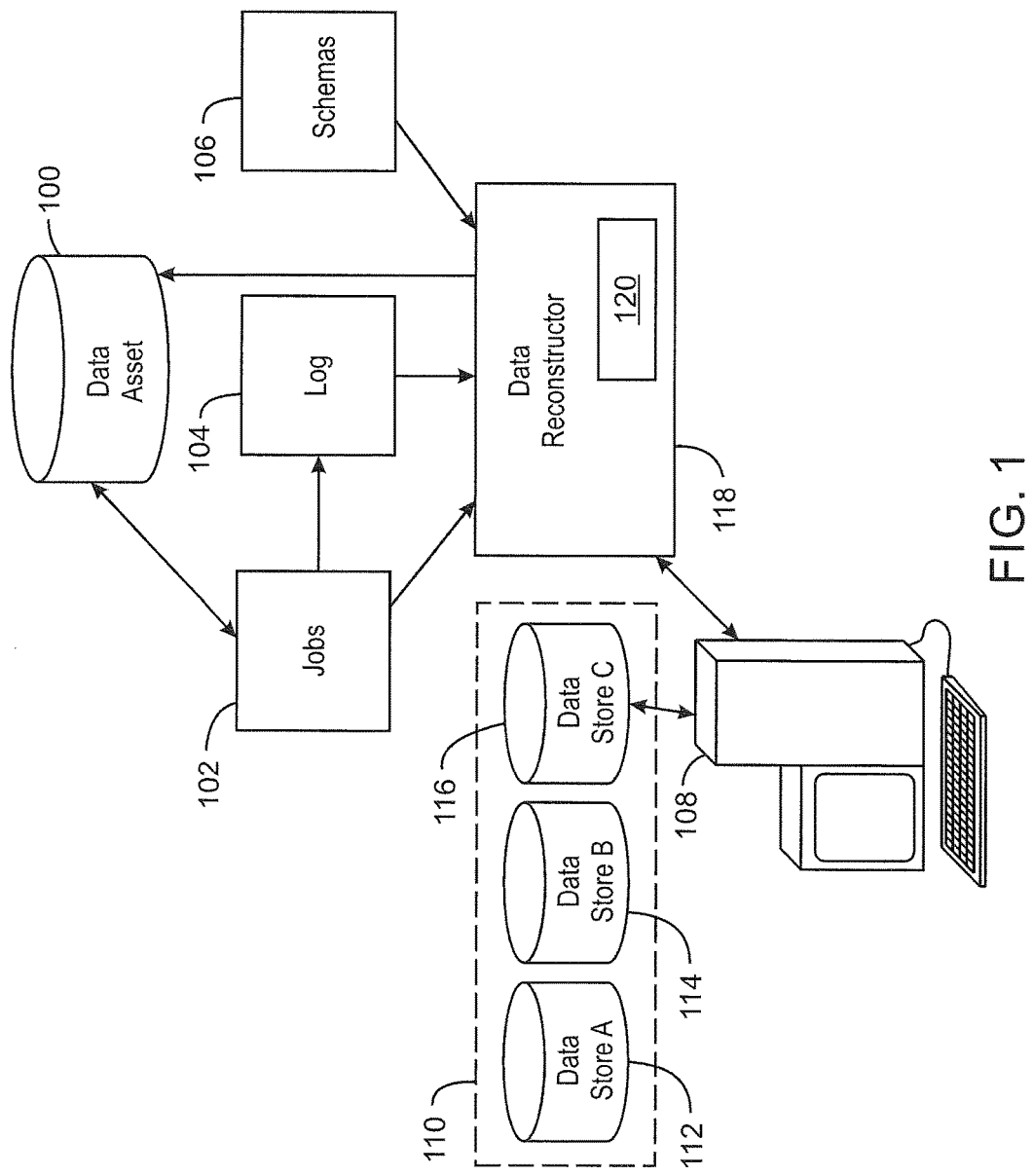
FIG. 1 is a block diagram of a system to provide a data lineage for a data asset in accordance with an embodiment.

FIG. 1 is a block diagram of a system to provide a data lineage for a data asset in accordance with an embodiment. In the system of FIG. 1, a data asset 100 may be populated by one or more jobs 102, such as extract, transform, and load (ETL) jobs well-known in the data warehousing arts. The data asset may be a data warehouse, database, and may also be an accumulation of computed data in a physical space, storage, memory, server, or other similar device.

Jobs 102 may refer by name to specific databases and fields, or may instead be data for use with different databases whose names and fields are known to jobs 102 at runtime. In one example, jobs 102 includes intermediate processes used to transport, generate, alter, or remove data from a data asset or data store. A log 104 may also be kept in which operational information is recorded when any of jobs 102 are run. One or more database schemas 106 describing the databases accessed by jobs 102 may also be included in the system provided.

The system may also include a computing device 108 to interface with data storage 110. The data storage 110 may include multiple and separate units for storing data including data store A 112, data store B 114, and data store C 116. The data used to initially generate the data asset 100 may come from a single data store unit, for example, data store A 112. Alternatively, the data asset may have been originally generated from data that originally came from a combination of data store unites, for example, data store B 114 and data store C 116. In another embodiment, the data stored in the data storage 110 or any of the storage units it contains may have been generated from the data asset 100.

The system may also include a data reconstructor 118 which may combine information from jobs 102, logs 104, and schemas 106 to obtain a data lineage 120 for the data asset 100. In some cases, the data reconstructor 118 may be implemented as logic, as hardware logic, or software configured to be carried out by a computing device, such as the computing device 118. In another embodiment, the data lineage 120 may have previously been generated for the data asset 100 and used by the data reconstructor 118 only when reconstructing a lost data asset 100.

As one example of how a data lineage may be formed, the data lineage of a GrossSales object of data asset 100 may be expressed to the data reconstructor 118 by identifying a) which job in log 104 wrote to GrossSales, b) what data was read by that job, and c) which other job 104 wrote that data. Steps b) and c) may be performed recursively along one or more paths within log 104 as required until one or more jobs are arrived at whose data sources are not traceable within log 104 to other jobs. The identified job path may then be combined with information from the jobs 102 that traversed along the job path, such as job commands or other job metadata, as well as with information regarding the schemas 106 referred to by log 104. Database names and other database parameters that are passed to a job along the job path may be inserted into the lineage in place of the job parameter variables. Thus, the parameters of a Job 102 may be replaced with database names or other database parameters that may indicate a link of a particular job 102 to a data source such as data source A 112, data source B 114, or data source C 114, as indicated by log 104.

Any of the elements of the embodiments referred to herein may be stored on, executed by, and/or otherwise managed by one or more computer devices 108 having access to a data storage 110 which may be a magnetic memory and/or any other known data storage device.

Figure 2:
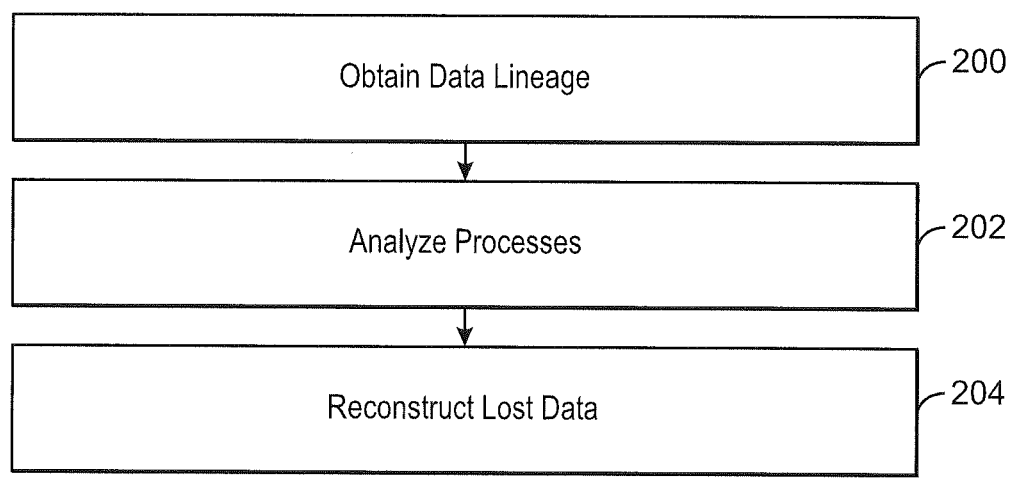
FIG. 2 is a simplified flowchart illustration of an exemplary embodiment of a method of data reconstruction.

FIG. 2 is a simplified flowchart illustration of a method of data reconstruction in accordance with an embodiment. In some embodiments, the exemplary method of FIG. 2 may be executed on the system pictured in FIG. 1, however the method is not limited only to that system.

At block 200, a data lineage for a lost data asset is obtained. This data lineage may be obtained as shown in the example discussed above, or may also be provided from data storage 110. The data lineage of the lost data asset may include any upstream or downstream processes. An upstream process may write data to the data asset from an upstream data asset. A downstream process may read data from the data asset and write it to a downstream asset or data source and may manipulate the data prior to writing it on the downstream asset. In some examples, the upstream and downstream data assets may each be located on a data source.

At block 202, each process is analyzed to see if they can be used to reconstruct the lost data asset 100. Upstream processes are analyzed to see if they can be rerun. Downstream processes are analyzed to see if they can be reverse-run. The processes that can be reverse-run are reversible.

At block 204, if an upstream process can be rerun, the data asset is reconstructed by rerunning the upstream process. A downstream process may also be used if no upstream process is runnable or if all upstream processes only partially reconstructed the data asset. If this is the case, a reversible downstream process may be used to reconstruct the data from a downstream data source.

As data reconstruction in this manner relies in part upon navigating the upstream and downstream processes and data sources, a data lineage that identifies the processes and data assets is useful in reconstructing a lost data asset. Further, in determining whether to pursue an upstream or a downstream process, a "recreation score" may be calculated prior to reconstructing with either process. The recreation score may be a value indicating the likelihood that lost data may be reconstructed for the data asset. The recreation score may be based on the number of upstream processes that are able to be rerun, for example. In some other examples, the recreation score may be the percentage of the lost data asset that is at a certain level or percentage reconstructed. Once a recreation score is calculated, the processes may be pursed in an order that reconstructs as much of the data asset with as few processes as possible.

Figure 3:
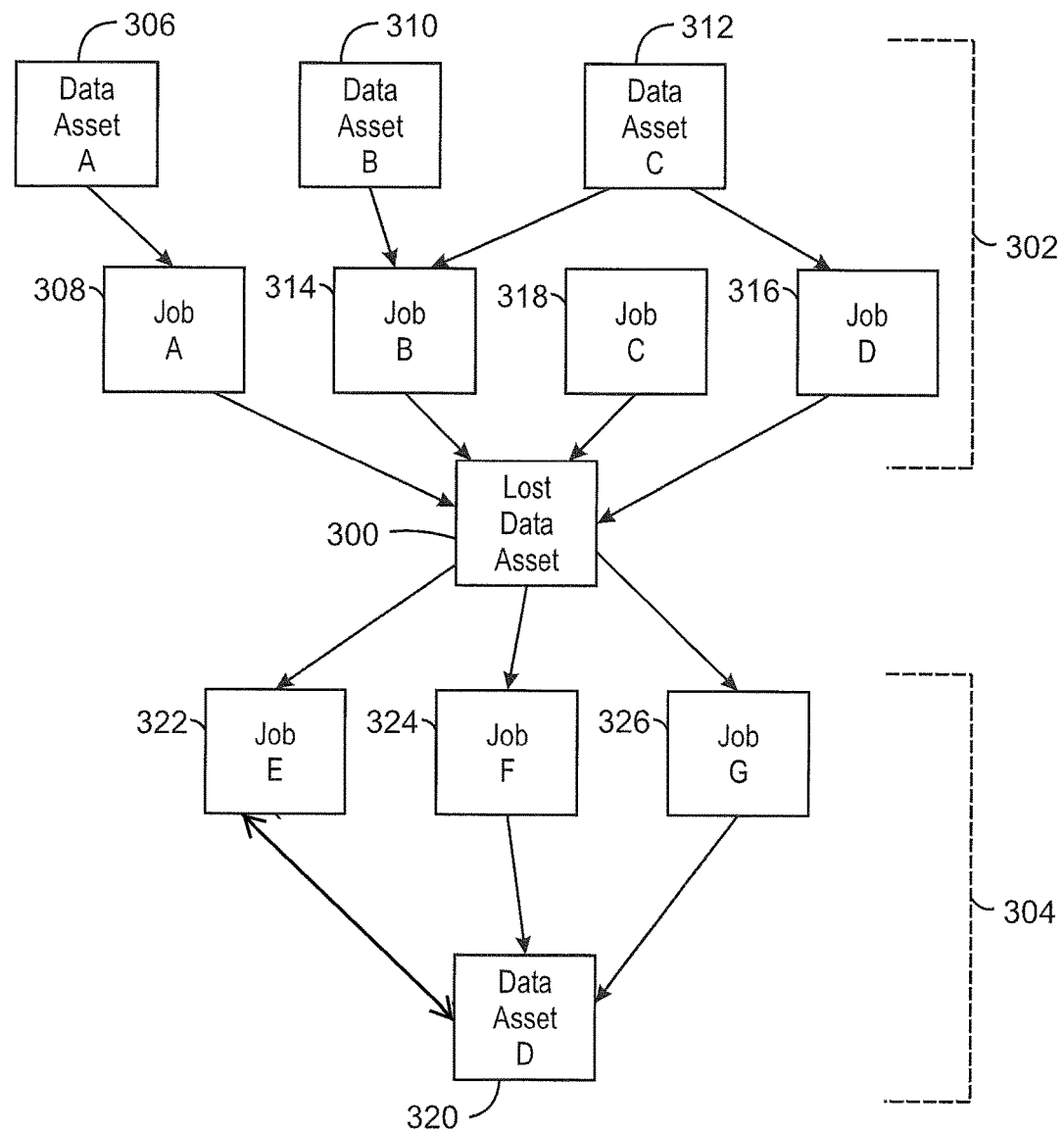
FIG. 3 is a block diagram of an example data flow when reconstructing a data asset in accordance with an embodiment.

FIG. 3 is a block diagram of an example data flow when reconstructing a data asset in accordance with an embodiment. This figure, in part, illustrates how a data asset exists within the context of a larger data flow, specifically showing how there are upstream processes that write data to it from upstream assets. This figure also shows how there are downstream processes that read data from it and write to downstream assets.

A lost data asset 300 may have been generated prior to its destruction or absence by upstream jobs and upstream data assets 302. Conversely, a lost data asset 300 may also be used to generate, prior to its destruction or absence, a number of downstream data assets 304. Each process, function, or operation between the lost data asset 300 and a data source can be known as an intermediate process. A data source, as referred to herein, may include an upstream asset, a downstream asset, or any combination thereof. In some examples, the lost data asset 300 may have been originally generated from multiples data sources, such as data asset B 310 and data asset C 312. The use of multiple sources may include their own intermediate processes, such as job B 314 and job D 316. As shown, not every intermediate process is paired exclusively to a data source, and in some cases the original generation of the data asset may have included a job C 318 which was not directly linked to any data asset, but instead may have included a job to be executed iteratively on existing data asset data, or instead simultaneous to another intermediate process such as job B 314.

When reconstructing the lost data asset 300, if it is determined that a particular data source and a particular intermediate process are rerunable, the lost data asset 300 can be reconstructed by rerunning the intermediate process. For example, an upstream rerunable job A 308 could have been executed upon its corresponding data source, here data asset A 306, in order to generate the lost data asset 300. If process A 308 is rerunable and if the data asset A 306 exists, then the lost data asset 300 can be reconstructed by rerunning this intermediate process with the data source.

A lost data asset 300 may also have been used in the generation of downstream data sources such as data asset D 320. The generation of this downstream data source may include the execution of several intermediate processes such as job E 322, job F 324, and job G 326 on the lost data asset 300 prior to it being lost. These jobs may have each independently been sufficient to generate data asset D 320. Alternatively, these jobs may have been used simultaneously or in a particular sequence, such as E-F-G in order to generate data asset D.

When reconstructing the lost data asset 300, if it is determined that a particular data source and a particular intermediate process are reversible, lost data asset 300 could be reconstructed by reversing the intermediate process. For example, the downstream reversible job E 322 could have been reversed and executed upon its corresponding data source, here data asset D 320, in order to generate the lost data asset 300. If several intermediate processes were executed in sequence to originally generate a data store such as data asset A, and each of these intermediate processes are reversible, then they can be used to reconstruct the lost data asset 300. For example, assume data asset D 320 is originally generated by the lost data asset 300 executing reversible jobs in the flowing sequence: job E 322, job F 324, and then job G 326. To reconstruct the lost data asset 300, these jobs should be reversible such that the reverse function or operation is performed if they are applied AND the sequence they were applied in should also be reversed. For example the reverse of each job would be applied to the data source, in this example data asset D, in the following order: the reverse of job G 326, the reverse of job F 324, and the reverse of job E 322.

As appreciated by one skilled in the art, embodiments may include a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Figure 4A:
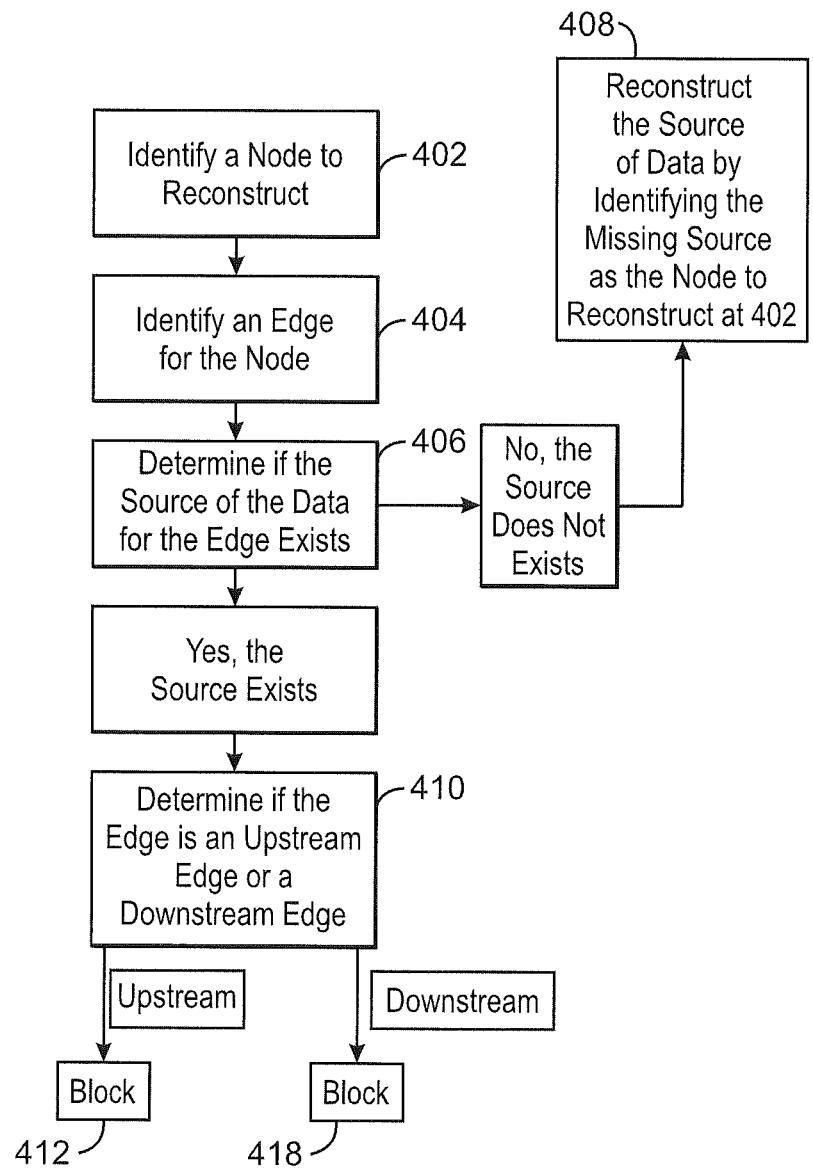
FIGS. 4A, 4B and 4C are example flowcharts illustrating an embodiment of a method for data asset reconstruction.
Figure 4B:
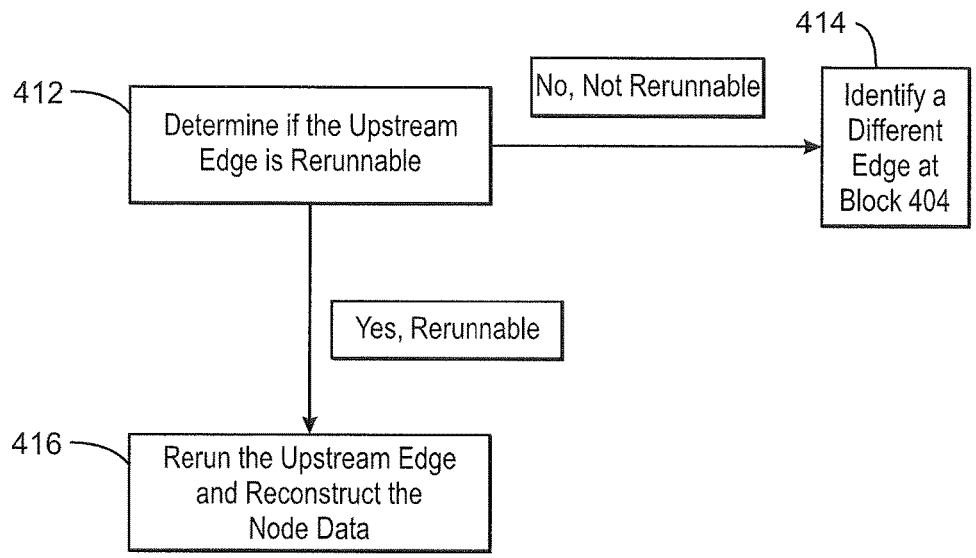
Figure 4C:
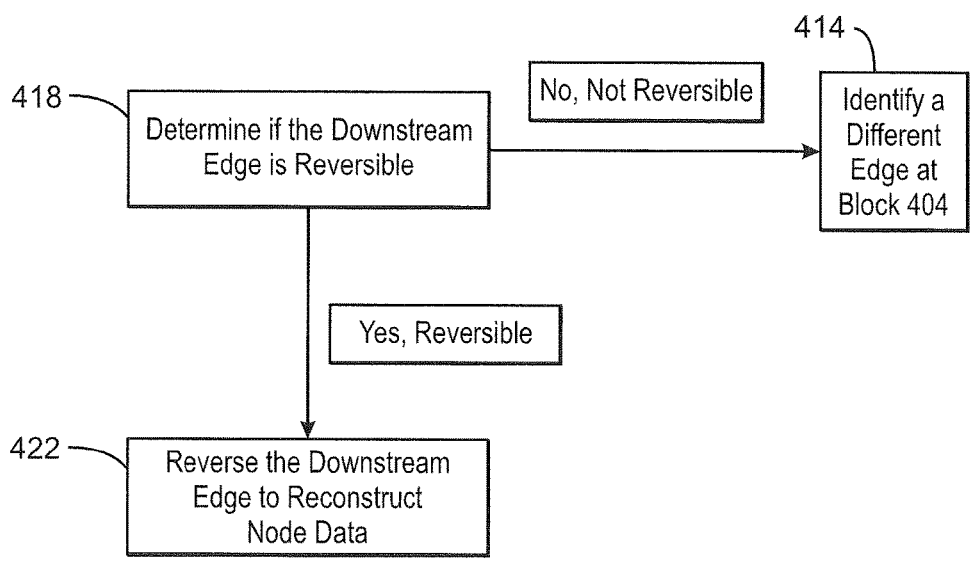

FIGS. 4A, 4B and 4C are example flowcharts illustrating one embodiment of a method 400 for data asset reconstruction. The data lineage is presumed as known within the scope of each of these figures.

In FIG. 4A addresses one version of the reconstruction method 400 prior to management of various upstream or downstream processes. At block 402, a node to reconstruct is identified. This node can be a data asset with partially missing data, or a former data asset which has since been completely wiped out by a natural disaster, system error, or any other cause resulting in lost data.

At block 404, an edge is identified for the node. The edge may be any process or function that handled data and is connected to the node. In some embodiments, the edge can be an intermediate process used in reconstruction.

At block 406, it may be determined if the source of the data for handed by the edge exists. If the source for the edge does not exist, process flow proceeds to block 408. A source of data may not exist for a number of reasons, including the edge was operating on data that was temporary or intermediate data and accordingly had no record. A source of data may not exist also if it was deleted, destroyed, or never created.

At block 408, the source of the data is reconstructed in the same manner as a node is reconstructed. Specifically, this step invokes a recursive reconstruction loop that can substitute the absent source of the data until a source of data is located and the intermediate sources of data or nodes may be reconstructed sufficiently to allow process flow to proceed to block 410. The feature allowing the process to restart for another node at block 402 prior to reconstructing the current node. In this way, a data source may be viewed as a first data source, an intermediate process may be viewed as a first intermediate process, and a data lineage may be viewed as a first data lineage. The method may identify a second lost data asset of the first data source upon which reconstruction of the first lost data asset depends. To reconstruct the second lost data asset, the method may invoke itself such that a second data lineage is received for the second lost data asset. The second data lineage may identify at least a second data source connected to the second lost data asset by a second intermediate process. The method then can allow the reconstruction of the second lost data asset with the second intermediate process and the second data source prior to reconstructing the first lost data asset. However, if at block 406, it was determined that the node did exist, process flow proceeds to block 410.

At block 410, it is determined if the edge is an upstream edge or a downstream edge. If the edge is an upstream edge, process flows to FIG. 4B and block 412. If the edge is a downstream edge, process flows to FIG. 4C and block 418.

In FIG. 4B, the method 400 of reconstructing a node illustrates one way an upstream edge may be used to reconstruct a node. At block 412, it is determined if the upstream edge can be rerun. If no, the upstream edge is not rerunable, process flow proceeds to block 414. If at block 412, yes, the upstream edge is rerunable, then process flow proceeds to block 416.

At block 414, a different edge for the node is identified. This may include returning to FIG. 4A block 404 to identify an edge for the node. At block 416, the upstream edge is rerun to reconstruct the node. Although this method refers to only a single upstream edge to fully reconstruct a node, rerunning of multiple upstream edges to reconstruct partial node data is also within the scope of this process.

In FIG. 4C, a downstream edge may be used to reconstruct the node. At block 418, it is determined if the downstream edge is reversible. If the downstream edge is not reversible, process flow proceeds to block 420. If at block 418, the upstream edge is reversible, then process flow proceeds to block 422.

At block 420, a different edge for the node is identified. This may include returning to FIG. 4A block 404 to identify an edge for the node. At block 422, the downstream edge is reversed and applied to the data source to reconstruct the node. Although this method refers to only a single downstream edge to fully reconstruct a node, reversing and use of multiple downstream edges to reconstruct partial node data is also within the scope of this process.

Figure 5:
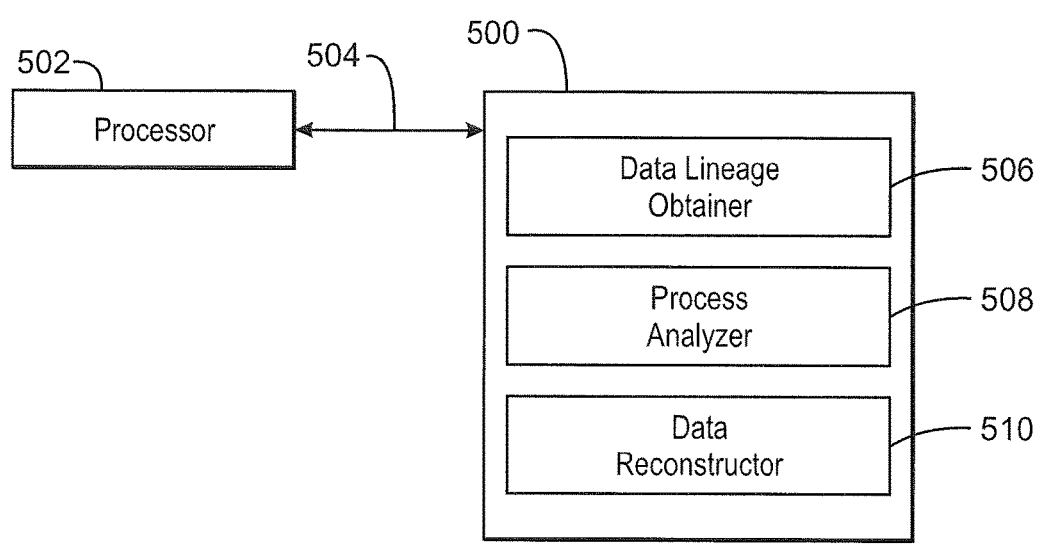
FIG. 5 is a block diagram depicting an example of a tangible, non-transitory computer-readable medium that can be used to reconstruct a data asset.

FIG. 5 is a block diagram depicting an example of a tangible, non-transitory computer-readable medium 500 that can be used to reconstruct a data asset in accordance with an embodiment. The computer-readable medium 500 may be communicatively coupled to a processor 502 by a bus 504. The processor 502 is enabled to execute instructions and commands sent from the computer-readable medium in order to yield a result.

In one example, the computer-readable medium 500 contains a data lineage obtainer 506 which obtains a data lineage for a lost data asset. The data lineage obtainer 506 may obtain a data lineage by creating it as shown in any example above, or it may also retrieve it from a stored location.

The computer-readable medium may also include a process analyzer 508 used for analyzing if processes are rerunable, reversible, and if the processes are upstream or downstream processes. The computer readable medium may also include a data reconstructor 510. The data reconstructor 510 may be used to implement the appropriate process as designated by the process analyzer 508. When reconstructing data, the data reconstructor 510 may work with both a process and a data source to yield the lost data asset.

FIG. 6 shows example pseudo code 600 illustrating the method to reconstruct a data asset in accordance with an embodiment. In addition to the figures above, another example method is shown in a pseudo code format highlighting the data asset manipulations, identifications, and analysis through the reconstruction process. In this pseudo code excerpt, it is assumed that a node graph is known, where each node represents a data asset. Further, in the pseudo code excerpt, each edge represents a process which may be an intermediate process. Each edge may further move data from a source node to a target node.

The pseudo code in this example is invoked on the node that needs to be reconstructed. From there the pseudo code traverses the known lineage graph to find nodes that were not damaged and can be used directly or indirectly to recreate the initial role.

Various helper methods are used in the pseudo code 600 including exist(node), isReRunable(edge), isReversible(edge), reverseRun(edge), and rerun(edge). The method "exist(node)" checks if node was damaged or if the data is still accessible. The method "isReRunnable(edge)" checks if the process can be run again, and thereby creating the data it wrote when it ran last. The method "isReversible(edge)" checks if the process can be run in reverse, and thereby creating the data it read when it ran last. The method "reverseRun(edge)" runs a process in reverse, and thereby creating the data it read when it ran last. The method "reRun(edge)" runs a process again, and thereby creating the data it wrote when it ran last.

The method "isReRunnable(edge)" checks if the process can be run again, and thereby create the data it wrote when it ran last. For example, A process is re-run-able if 1) the source data that the process read from still exists, partially or totally. A process is also re-run-able if 2) either the process did not change the source data, (i.e. it performed a read only operation) and the source data has not changed since the process ran last or if the source data was changed by a known one-to-one function.

The method "rerun(edge)" runs a process again and thereby creates the data it wrote when it ran last. If the process did not change the source data and the source data has not changed since the process ran last, the process that the edge represents is rerun. If the source data was changed by a known one-to-one function, namely f(x), then the reverse function $f^{-1}(x)$ needs to be applied to the data and then rerun the process that the edge represents.

The method "isReversible(edge)" checks if the process can be run in reverse, and thereby create the data it read when it ran last. Specifically, there are various types of functions that comprise a process. For example, 1) Non reversible functions—e.g. Aggregation, Average, Absolute Value; 2) Partially reversible—e.g. Upper, Pad, Trim; and 3) Reversible—e.g. Compress, Divide, Logical Not. If a process contains one or more functions of type 1, it is not reversible. If a process contains one or more functions of type 2 and no functions of type 1, it is partially reversible. This means the process can be reversed, but there can be some data loss. If a process contains only functions of type 3, it is fully reversible The method "reverseRun(edge)" runs in reverse, and thereby creates the data it read when it read last. As background, a process is comprised of functions. Further, a process can be reversed by creating a new process that reverses the overall functionality of the initial process. Specifically, this is done by using compensating functions. The following list shows some functions and their compensating function: Encode→Decode; Compress→Expand; Divide→Multiply; Lookup→Reverse Lookup; Logical operator→opposite logical operator; Mathematical function-→Inverse function.

Furthermore, and as discussed above, if a data asset has had multiple data edges applied in a specific order, the new process is created in the following way: 1) traverse the functions that comprised the original process in reverse order, and 2) for each function, add to the new process the compensating function.

The initial process may include the following flow of functions: divide(datum)→encode(datum)→compress(datum). A reversible process may include: expand(datum)→decode(datum)→multiply(datum).

Lastly, sometimes when executing the described embodiments, the data cannot be fully reconstructed. Nevertheless, it can be valuable to execute the techniques described herein anyway as doing so may at least provide a partial data reconstruction. Examples of where the data can only be partially reconstructed may include two downstream processes read from the data asset, but only one of them may be reverse run. Another example includes two upstream processes that write to the data asset, but only one of them can be rerun. In this case the downstream process is only partially reversible. However, the upstream or downstream data sources have been updated since the processes ran last.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A system for data asset reconstruction, comprising:
a memory having computer readable instructions; and
a processor for executing the computer readable instructions, the computer readable instructions including:
receiving a data lineage for a data asset, wherein the data lineage identifies a data source connected to the data asset by an intermediate process;
determining whether the data source is downstream or upstream from a lost data asset;
based on determining that the data source is downstream from the lost data asset:
determining whether the intermediate process can be used to reconstruct the lost data asset; and
based on determining that the intermediate process can be used to reconstruct the lost data asset, including determining that the intermediate process is reversible, reconstructing the lost data asset by reversing the intermediate process from the data source to yield the lost data asset,
wherein the intermediate process is reversible if the intermediate process is capable of being run in reverse to create the lost data asset as output using the data source as input; and
based on determining that the data source is upstream from the lost data asset:
determining whether the intermediate process can be used to reconstruct the lost data asset; and based on determining that the intermediate process can be used to reconstruct the lost data asset, including determining that the intermediate process is re-runnable, reconstructing the lost data asset by re-running the intermediate process from the data source to yield the lost data asset, wherein the intermediate process is re-runnable if the intermediate process did not change the data source or if the intermediate process is a known one-to-one function.

2. The system recited in claim 1, wherein:
the data source is upstream from the lost data asset in the data lineage.

3. The system recited in claim 1, wherein:
the data source is downstream from the data asset in the data lineage.

4. The system recited in claim 1, wherein the lost data asset is a first lost data asset, the data source is a first data source, the intermediate process is a first intermediate process, the data lineage is a first data lineage, and the computer instructions further include:
identifying a second lost data asset of the first data source upon which reconstruction of the first lost data asset depends;
receiving a second data lineage for the second lost data asset, wherein the second data lineage identifies at least a second data source connected to the second lost data asset by a second intermediate process; and
reconstructing the second lost data asset with the second intermediate process and the second data source prior to reconstructing the first lost data asset.

5. The system recited in claim 1, wherein the computer instructions further include reconstructing a portion of the lost data asset even if a full version of the lost data asset cannot be reconstructed.

6. A method for data asset reconstruction comprising:
obtaining, by a processor, a data lineage for a data asset at a memory location, wherein the data lineage identifies a data source related to the data asset by an intermediate process;
determining whether the data source is downstream or upstream from a lost data asset;
based on determining that the data source is downstream from the lost data asset:
analyzing, by the processor, the intermediate process to determine whether it can be used to reconstruct the lost data asset; and
based on determining that the intermediate process can be used to reconstruct the lost data asset, including determining that the intermediate process is reversible, reconstructing, the processor, the lost data asset by reversing the intermediate process from the data source to yield the lost data asset,
wherein the intermediate process is reversible if the intermediate process is capable of being run in reverse to create the lost data asset as output using the data source as input; and
based on determining that the data source is upstream from the lost data asset:
determining whether the intermediate process can be used to reconstruct the lost data asset; and
based on determining that the intermediate process can be used to reconstruct the lost data asset, including determining that the intermediate process is re-runnable, reconstructing the lost data asset by re-running the intermediate process from the data source to yield the lost data asset, wherein the intermediate process is re-runnable if the intermediate process did not change the data source or if the intermediate process is a known one-to-one function.

7. The method recited in claim 6, wherein:
the data source is upstream from the data asset in the data lineage.

8. The method recited in claim 6, wherein:
the data source is downstream from the data asset in the data lineage.

9. The method recited in claim 8, wherein reversing the intermediate process from the data source comprises:
based on determining that a function was used as part of the intermediate process to generate the data source, a compensating function of the function is applied to the data source, wherein the compensating function reverses processing performed by the function; and
based on determining that more than one function was used as part of the intermediate process to generate the data source, the order of the more than one functions is reversed to establish a new order and the compensating function for each of the more than one function are applied to the data source in the new order.

10. The method recited in claim 6, wherein the lost data asset is a first lost data asset, the data source is a first data source, the intermediate process is a first intermediate process, the data lineage is a first data lineage further comprising:
identifying a second lost data asset of the first data source upon which reconstruction of the first lost data asset depends;
receiving a second data lineage for the second lost data asset, wherein the second data lineage identifies at least a second data source connected to the second lost data asset by a second intermediate process; and
reconstructing the second lost data asset with the second intermediate process and the second data source prior to reconstructing the first lost data asset.

11. A computer program product comprising:
a non-transitory computer readable storage medium having program instructions embodied therewith, the program instructions executable by a processor to perform a method comprising:
receiving a data lineage for a data asset, wherein the data lineage identifies a data source connected to the data asset by an intermediate process;
determining whether the data source is downstream or upstream from a lost data asset;
based on determining that the data source is downstream from the lost data asset:
determining whether the intermediate process can be used to reconstruct the lost data asset; and
based on determining that the intermediate process can be used to reconstruct the lost data asset, including determining that the intermediate process is reversible, reconstructing the lost data asset by reversing the intermediate process from the data source to yield the lost data asset,
wherein the intermediate process is reversible if the intermediate process is capable of being run in reverse to create the lost data asset as output using the data source as input; and
based on determining that the data source is upstream from the lost data asset:
determining whether the intermediate process can be used to reconstruct the lost data asset; and based on determining that the intermediate process can be used to reconstruct the lost data asset, including determining that the intermediate process is re-runnable, reconstructing the lost data asset by re-running the intermediate process from the data source to yield the lost data asset, wherein the intermediate process is re-runnable if the intermediate process did not change the data source or if the intermediate process is a known one-to-one function.

12. The computer program product of claim 11, wherein: the data source is upstream from the lost data asset in the data lineage.

13. The computer program product of claim 11, wherein the data source is downstream from the data asset in the data lineage.

14. The system recited in claim 1, wherein reversing the intermediate process from the data source comprises:

based on determining that a function was used as part of the intermediate process to generate the data source, a compensating function of the function is applied to the data source; and based on determining that more than one function was used as part of the intermediate process to generate the data source, the order of the more than one functions is reversed to establish a new order and the compensating function for each of the more than one function are applied to the data source in the new order.

* * * * *